(12) United States Patent
Shalev et al.

(10) Patent No.: US 8,930,965 B1
(45) Date of Patent: Jan. 6, 2015

(54) EVENT-DRIVEN STATE-MACHINE SEQUENCER

(71) Applicant: Marvell International, Ltd., Hamilton (BM)

(72) Inventors: Tal Shalev, Kfar Shmuel (IL); Ariel Pinhas, Meitar (IL)

(73) Assignee: Marvell International Ltd, Hamilton (BM)

( * ) Notice: Subject to any disclaimer, the term of this patent is extended or adjusted under 35 U.S.C. 154(b) by 0 days.

(21) Appl. No.: 13/778,169

(22) Filed: Feb. 27, 2013

Related U.S. Application Data

(60) Provisional application No. 61/604,234, filed on Feb. 28, 2012.

(51) Int. Cl.
*G06F 9/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ..................................... *G06F 9/542* (2013.01)

USPC ........................................................ 719/318

(58) Field of Classification Search
None
See application file for complete search history.

(56) References Cited

U.S. PATENT DOCUMENTS

| | | | |
|---|---|---|---|
| 5,546,543 A * | 8/1996 | Yang et al. ..................... | 709/235 |
| 7,526,634 B1 * | 4/2009 | Duluk et al. .................. | 712/216 |
| 8,255,912 B2 * | 8/2012 | Brackman ...................... | 718/103 |
| 8,392,351 B2 * | 3/2013 | Brdiczka et al. ................ | 706/58 |
| 2012/0198101 A1 * | 8/2012 | Porcella et al. ................. | 710/12 |

* cited by examiner

*Primary Examiner* — H S Sough
*Assistant Examiner* — William C Wood

(57) ABSTRACT

A method includes, in a communication device, defining multiple state machines including states and respective state conditions that depend on a set of events. Relative priorities are defined, to be applied among the state machines in scheduling the state machines for execution in response to the events. The events are monitored and the state conditions are evaluated based on the monitored events. The state machines are executed based on the evaluated state conditions using a scheduling order that depends on the priorities.

16 Claims, 3 Drawing Sheets

EVENT-DRIVEN STATE-MACHINE SEQUENCER

CROSS-REFERENCE TO RELATED APPLICATIONS

This application claims the benefit of U.S. Provisional Patent Application 61/604,234, filed Feb. 28, 2012, whose disclosure is incorporated herein by reference.

FIELD OF THE DISCLOSURE

The present disclosure relates generally to communication systems, and particularly to execution of state machines in communication devices.

BACKGROUND

Complex processes are commonly modeled by State Machines (SMs). State machines are used, for example, for triggering the execution of communication processing tasks in communication devices such as cellular phones.

SUMMARY

An embodiment that is described herein provides a method including, in a communication device, defining multiple state machines including states and respective state conditions that depend on a set of events. Relative priorities are defined, to be applied among the state machines in scheduling the state machines for execution in response to the events. The events are monitored and the state conditions are evaluated based on the monitored events. The state machines are executed based on the evaluated state conditions using a scheduling order that depends on the priorities.

In some embodiments, defining the priorities includes defining first priorities for scheduling the execution of a first subset of the state machines in response to a first event in the set, and defining second priorities, different from the first priorities, for scheduling the execution of a second subset of the state machines in response to a second event in the set.

In an embodiment, defining the state machines includes defining for each state machine a respective subset of the events that is to trigger the state machine, and executing the state machines includes triggering each state machine only in response to detecting one or more of the events in the respective subset. In another embodiment, executing the state machines includes triggering one or more hardware or software modules in the communication device.

In some embodiments, defining the state machines includes defining the state conditions depending on an occurrence pattern of the events over a history interval that spans multiple time frames of a communication protocol used by the communication device. In an example embodiment, executing the state machines includes assigning operating parameters to a given state machine in a first time frame, and actually activating the given state machine in a second time frame that is different from the first time frame. In an embodiment, executing the state machines includes activating a first instance of a given state machine in a first time frame, and activating a second instance of the given state machine, independently of the first instance, in a second time frame.

There is additionally provided, in accordance with an embodiment that is described herein, an apparatus including processing circuitry, a memory and a sequencer. The processing circuitry is configured to execute multiple state machines including states and respective state conditions that depend on a set of events. The memory is configured to store a definition of relative priorities to be applied among the state machines in scheduling the state machines for execution in response to the events. The sequencer is configured to monitor the events and evaluate the state conditions based on the monitored events, and to instruct the processing circuitry to execute the state machines based on the evaluated state conditions using a scheduling order that depends on the priorities.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for scheduling and executing event-driven state machines. The disclosed techniques can be used, for example, in communication devices such as cellular phones.

In some embodiments, a communication device comprises processing circuitry that executes multiple state machines. Each state machine is defined in terms of states, transitions between states and state conditions that allow or prevent execution of the states. The state conditions depend on a set of events in the communication device.

A sequencer monitors the events, evaluates the state conditions and schedules the state machines for execution accordingly. Executing a state machine typically triggers various modules in the communication device such as software tasks or hardware accelerators, triggers a change of system configuration of other parameter, activates or deactivates one or more other state machines, or initiates any other suitable action.

In some embodiments, each event corresponds to one or more related state machines that should be executed when the event occurs. When a certain event is defined as triggering multiple state machines, the sequencer schedules these related state machines for execution in an order that depends on predefined priorities among the state machines. Different events may relate to different sets of related events and/or use different sets of execution priorities.

In other embodiments, the state conditions depend on an occurrence pattern of the events, i.e., on the specific occurrence sequence of the events over time. In an example embodiment, the communication device operates in accordance with a certain communication protocol, and the state conditions depend on the event occurrence pattern over a "history interval" that spans multiple time frames of the protocol.

The disclosed scheduling and execution techniques are highly flexible to define and reconfigure, scalable and modular, quick to respond to events and easy to debug. The schemes described herein can be implemented in hardware and/or software.

Figure 1:
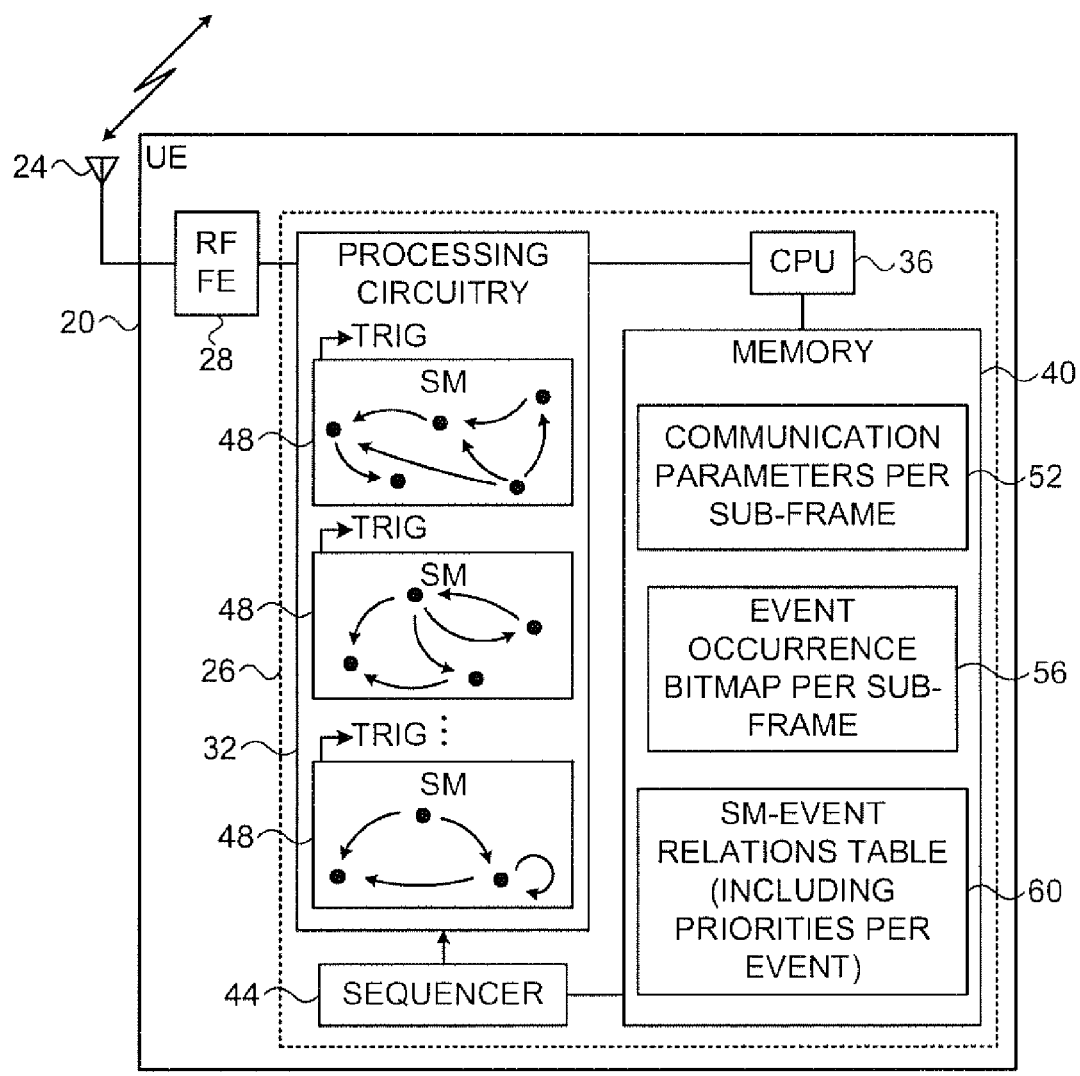
FIG. 1 is a block diagram that schematically illustrates a communication device, in accordance with an embodiment that is described herein.

FIG. 1 is a block diagram that schematically illustrates a communication device 20, in accordance with an embodiment that is described herein. In the present example device 20 comprises a mobile wireless communication terminal that operates in a Long Term Evolution (LTE) or LTE-Advanced (LTE-A) network. The terminal is also referred to as User Equipment (UE) in LTE terminology. In alternative embodiments, device 20 may comprise various other types of communication devices, such as a base station.

UE 20 typically communicates with a base station, such as an LTE or LTE-A eNodeE. The UE comprises an antenna 24 and a Radio Frequency Front End (RF FE) 28, for transmitting and receiving RF signals to and from the base station. Among other functions, RF FE 28 converts received RF signals to digital baseband signals, and converts digital baseband signals for transmission to RF signals. In an embodiment, UE 20 comprises a baseband processor 26, which carries out the various baseband processing functions of the UE.

In the present example, baseband processor 26 comprises processing circuitry 32, a Central Processing Unit (CPU) 36, a memory 40 and a sequencer 44. (In alternative embodiments the CPU is external to the baseband processor.) Processing circuitry 32 performs various signal and data processing tasks of the UE. Sequencer 44 schedules the various processing tasks using methods that are described in detail herein. CPU 36 manages the overall UE operation. Memory 40 holds various data structures used by processing circuitry 32, CPU 36 and sequencer 44.

UE 20 typically operates in accordance with a certain communication protocol that partitions the time domain into time frames. In LTE and LTE-A, communication is performed in a sequence of downlink and uplink sub-frames. The terms "time frames," "frames" and "sub-frames" are used interchangeably herein. The time-frame structure of the communication protocol affects the scheduling and operation of sequencer 44 and processing circuitry 32.

In some embodiments, CPU 36 stores in memory 40 a communication parameter table 52, which specifies the communication parameters to be used in each sub-frame of the protocol. The communication parameters of a sub-frame may define, for example, whether the sub-frame is an uplink or downlink sub-frame, as well as any suitable transmission or reception parameter.

In some embodiments, processing circuitry 32 comprises multiple State Machines (SMs) 48 that are configured to execute respective processing tasks. Processing tasks related to signal reception comprise, for example, demodulation and decoding of downlink control and data channels, channel quality estimation, channel feedback calculation, and many others. Processing tasks related to signal transmission comprise, for example, modulation, encoding of uplink control and data channels, among others. Additionally or alternatively, SMs 48 may carry out any other suitable processing task in UE 20. In an embodiment, each task is related to a certain time frame of the communication protocol, although a task may relate to multiple time frames.

Each SM 48 typically comprises multiple states, state conditions that govern the transitions between the states and execution of the states, and actions associated with the states and/or transitions. The actions typically involve triggering various modules in the UE (indicated as "TRIG" in the figure), such as software tasks or hardware accelerators, triggering a change of system configuration of other parameter, activation or deactivation of one or more other state machines, or any other suitable action. Execution of a given SM 48 may trigger any suitable combination of such modules. SMs 48 may be implemented in software, in hardware, or both.

SMs 48 are typically event-driven. The events triggering execution of the SMs may comprise hardware events, software events, or both. One or more of the events possibly originate in SMs 48, and thus introduce dependence and hierarchy between different SMs. In the present example, memory 40 stores a SM-event relations table 60, which specifies the (one or more) SMs to be triggered by each event. Table 60 also defines, for each event, relative execution priorities among the SMs.

In an embodiment, table 60 is implemented as a Look-Up Table (LUT) or as a dynamically-configurable table. An example of a SM-event relations table is shown in the following table:

TABLE 1

Example SM-event relations table

| Event ID | # of related SMs | SM ind_1 | SM ind_2 | SM ind_3 | SM ind_4 | SM ind_5 |
|---|---|---|---|---|---|---|
| event id_0 | 1 | SM_B | | | | |
| event id_1 | 2 | SM_F | SM_B | | | |
| event id_2 | 4 | SM_B | SM_F | SM_A | SM_C | |
| event id_3 | 1 | SM_C | | | | |
| event id_4 | 3 | SM_A | SM_B | SM_C | | |
| event id_5 | 1 | SM_E | | | | |

In the example above, table 60 correlates six events denoted event_id__0 . . . event_id__5 with five state machines denoted SM_A . . . SM_F. Each row of the table specifies the SMs that are to be triggered upon occurrence of the respective event. For example, the second row specifies that sequencer 44 should trigger SM_F and SM_B in response to occurrence of event_id__1.

The order in which the SM indices appear in each row specifies their relative execution priorities, i.e., the order in which sequencer 44 should trigger the SMs. For example, the fifth row specifies that upon occurrence of id_event__4, the sequencer is to trigger SM_A, then SM_B and only then SM_C.

In the present example, each SM 48 is triggered by a specific occurrence pattern of events in UE 20. The occurrence pattern corresponding to a given SM specifies the sequence of events that triggers the SM, including the sub-frame in which each event should occur in order to match the pattern. The occurrence pattern spans a number of sub-frames that is referred to as a "history interval." The event occurrences are tracked and recorded by sequencer 44 in an event occurrence bitmap table 56 in memory 40.

An example of an event occurrence bitmap table is shown in the following table:

TABLE 2

Example event occurrence bitmap table

| Sub-frame index | event_id_0 | event_id_1 | event_id_2 | event_id_3 | event_id_4 | event_id_5 |
|---|---|---|---|---|---|---|
| n−6 | 1 | 0 | 0 | 1 | 0 | 0 |
| n−5 | 0 | 0 | 0 | 0 | 0 | 0 |
| n−4 | 1 | 0 | 0 | 0 | 0 | 1 |
| n−3 | 0 | 0 | 1 | 0 | 0 | 0 |
| n−2 | 0 | 0 | 0 | 0 | 1 | 0 |
| n−1 | 0 | 0 | 0 | 0 | 0 | 1 |
| n | 0 | 1 | 0 | 0 | 0 | 0 |

In the example of Table 2, the history interval spans seven sub-frames, wherein sub-frame n denotes the current sub-frame. Six events denoted event_id_0 ... event_id_5 are tracked. In alternative embodiments, any other suitable number of events may be tracked over any other suitable history interval. A "1" in the bitmap entry of the $i^{th}$ event and the $j^{th}$ frame indicates that the $i^{th}$ event occurred in the $j^{th}$ sub frame. A "0" in the bitmap entry of the $i^{th}$ event and the $j^{th}$ frame indicates that the $i^{th}$ event did not occur in the $j^{th}$ sub-frame.

When a certain SM 48 is active, execution of the current SM state is enabled when a respective state condition, which depends on the occurrence pattern of events, is met. Typically, sequencer 44 evaluates the state conditions of the various states of the various SMs by querying table 56, and decides whether to execute the current state depending on the corresponding state condition.

The UE configuration shown in FIG. 1 is a highly simplified example configuration, which is depicted solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 20, including, for example, RF FE 28, processing circuitry 32, CPU 36 and sequencer 44, are implemented in hardware. For example, RF FE 28 is implemented in some embodiments using one or more Radio Frequency Integrated Circuits (RFICs), and processing circuitry 32 is implemented in some embodiments using one or more Field-Programmable Gate Arrays (FPGAs) or Application-Specific Integrated Circuits (ASICs). Memory comprises any suitable type of memory device, for example Random Access Memory (RAM) or non-volatile memory such as Flash memory.

In alternative embodiments, certain UE elements are implemented in software, such as implementing sequencer 44 is a Digital Signal Processor (DSP) device or implementing CPU 36 using a programmable microprocessor. In other embodiments certain UE elements are implemented using a combination of hardware and software elements. In some embodiments, some or all of the elements of UE 20 are implemented in a signal processing chip-set for use in mobile communication terminals.

In some embodiments, certain UE elements, such as certain elements of processing circuitry 32, CPU 36 and/or sequencer 44, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
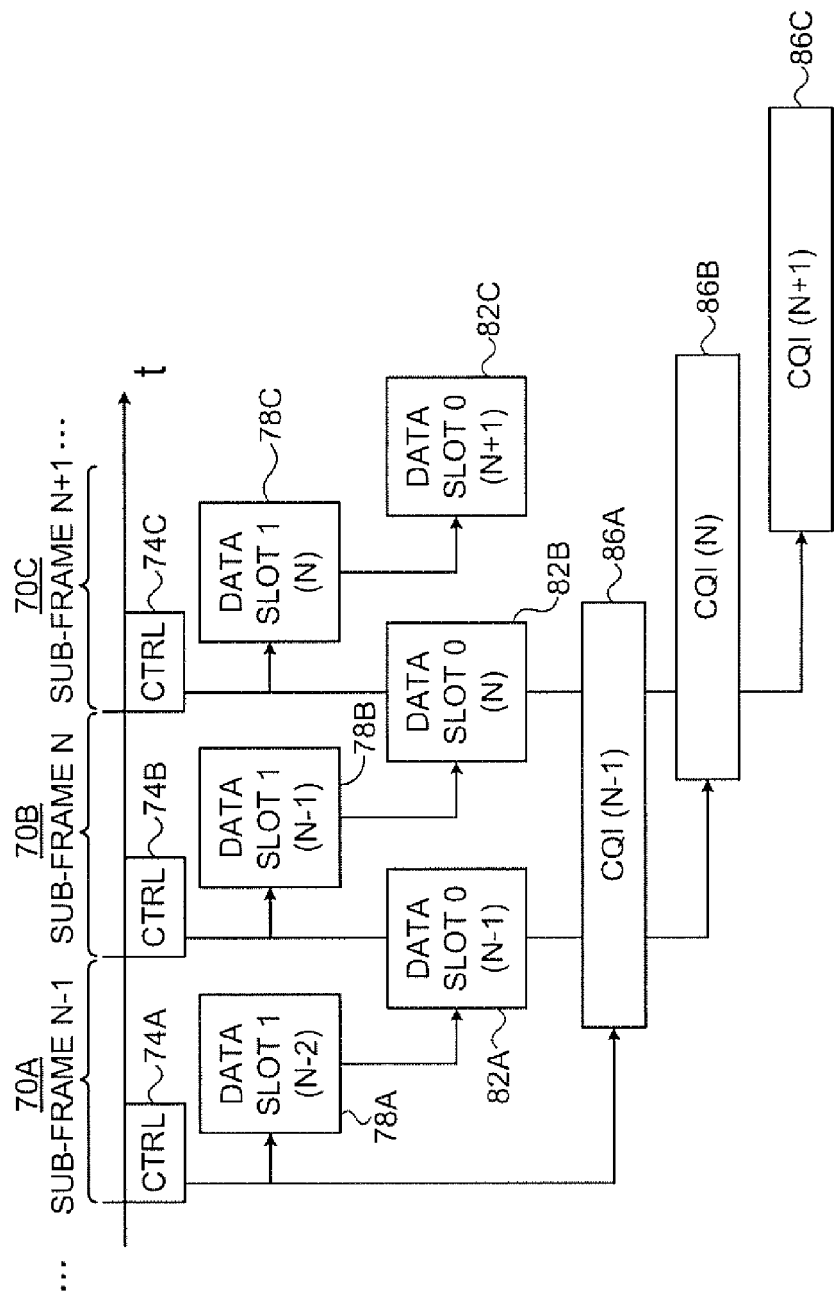
FIG. 2 is a timing diagram that schematically illustrates execution of multiple event-driven state machines, in accordance with an embodiment that is described herein.

FIG. 2 is a timing diagram that schematically illustrates execution of multiple event-driven state machines, in accordance with an embodiment that is described herein. The example of FIG. 2 demonstrates event-driven triggering of SMs for processing a sequence of LTE downlink sub-frames. As explained above, in some embodiments multiple SMs are triggered by a certain event in accordance with respective priorities.

The figure shows three sub-frames 70A ... 70C having indices N−1, N and N+1. In this example, processing circuitry 32 comprises four types of state machines. In each sub-frame, sequencer 44 (FIG. 1) triggers a respective instance of each state machine.

Processing of sub frame N−1 begins with sequencer 44 invoking a "CTRL" state machine instance 74A, which decodes a control channel that is transmitted in the first symbols of the sub-frame. At a certain stage of decoding the control channel, sequencer 44 triggers a state machine instance 78A that decodes slot-1 data remaining from the previous sub-frame (N−2).

At a certain stage of decoding the slot-1 data of sub-frame (N−2), the sequencer triggers a state machine instance 82A, which decodes slot-0 data of the current sub-frame (N−1). Additionally, at a certain stage of decoding the control channel, sequencer 44 triggers a state machine instance 86A that estimates the Channel Quality Indicator (CQI) based on the data in sub-frame N−1.

Sequencer 44 carries out a similar scheduling process in sub-frames N and N+1. In sub-frame N the sequencer invokes state machine instances 74B, 78B, 82B and 86B using similar triggering events. In sub-frame N+1 the sequencer invokes state machine instances 74C, 78C, 82C and 86C in a similar manner.

The example of FIG. 2 is a highly simplified example, which is shown for the sake of clarity. Real-life processing in a UE typically comprises a large number of state machine instances and complex events. The example of FIG. 2 demonstrates some features of the disclosed techniques:

In some embodiments, one state machine is triggered depending on the execution status of another state machine. This dependence enables sequencer 44 to apply the sequence of operations shown in the figure. It is possible for several state machines to operate simultaneously.

In some embodiments, sequencer 44 invokes multiple instances of a state machine (e.g., one per sub-frame). Each instance is typically managed independently of the others, e.g., operates on different data, and activated and deactivated at different times. It is possible for several state machine instances to operate simultaneously.

In some embodiments, a state machine is triggered during a certain sub-frame, but its execution spans more than one sub-frame. In FIG. 2, for example, state machine instances 86A ... 86B (CQI estimation) are each executed during three consecutive sub-frames or parts thereof.

Each state machine (or state machine instance) is activated at a certain time, and is assigned operation parameters at a certain time. The activation time may be the same as or different from the parameter assignment ("parameter inheritance") time. In an example embodiment, a state machine may be activated in a certain sub-frame but inherit parameters from a different (earlier or later) sub-frame. One example is the CQI estimation state machine, which is activated in a certain sub-frame but operates on data originating from several sub-frames.

Figure 3:
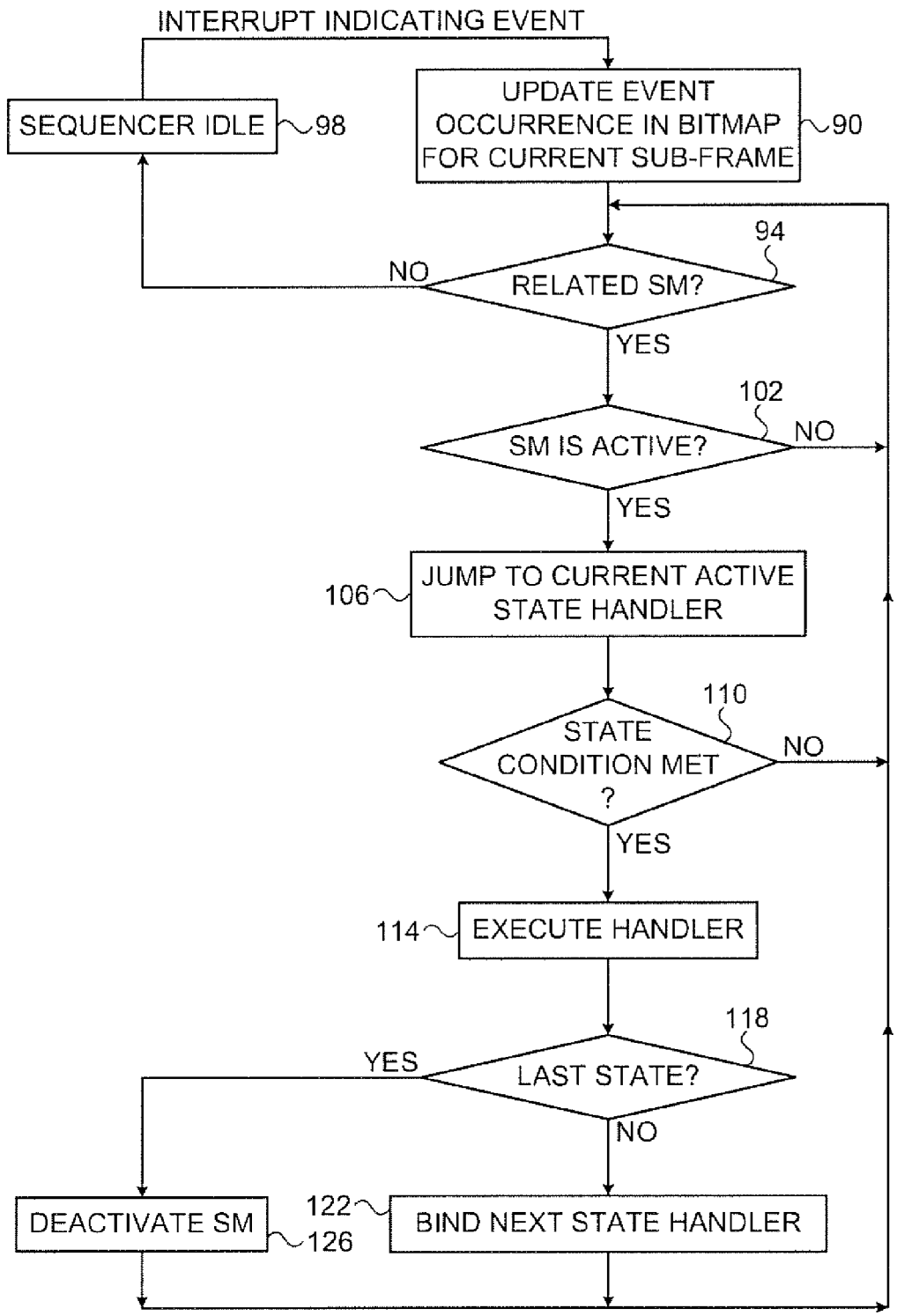
FIG. 3 is a flow chart that schematically illustrates a method for scheduling event-driven state machines, in accordance with an embodiment that is described herein.

FIG. 3 is a flow chart that schematically illustrates a method for scheduling event-driven state machines, in accordance with an embodiment that is described herein. The method, which is described with reference to FIG. 1 and FIG.

3, begins when sequencer 44 is invoked by receiving a hardware or software interrupt that indicates occurrence of an event.

In response to the interrupt, sequencer 44 updates event occurrence bitmap 56 with the new event, at a bitmap updating operation 90. Sequencer 44 checks whether the new event is related to any of SMs 48, at a relation checking operation 94. The sequencer typically obtains this information from SM-events relation table 60. If none of the SMs is related to the event, sequencer 44 enters an idle state 98, until another event occurs.

If one or more of SMs 48 are related to the event, sequencer 44 begins a process that executes the related SMs in accordance with their priorities. Sequencer 44 selects the first (highest-priority) related SM in table 60.

The sequencer checks whether the selected SM is active or inactive, at an activity checking operation 102. In this embodiment, each SM has an active/inactive flag that indicates whether the SM is active or not. Only active SMs are to be executed in response to events. If the selected SM is inactive, the method loops back to operation 94 above in which the sequencer checks whether other SMs related to the event remain to be executed.

If the selected SM is active, the sequencer jumps to the current active state handler, at a handler invocation operation 106. (The state handler is the module, typically implemented in software, which executes the actions specified for the respective state.) Typically, each SM has a state pointer that points to the current state of the SM. The state pointer is initialized when the SM is activated, and tracks the current state until the SM is deactivated. Sequencer 44 typically invokes the current state handler at this stage.

Sequencer 44 now checks whether the state condition for the state handler is met, at a state condition checking operation 110. As explained above, the state condition typically depends on the event occurrence pattern, possibly in combination with other factors. Thus, sequencer 44 evaluates whether the state condition is met or not by querying event occurrence bitmap 56. If the state condition is not met, the method loops back to operation 94 above.

If the state condition is met, sequencer 44 executes the state handler, at an execution operation 114. Executing the state handler may involve triggering one or more modules in UE 20, generating one or more events, activating or deactivating one or more SMs, and/or performing any other suitable action.

Sequencer 44 now checks whether the executed state was the last state to be executed in this SM, at a completion checking operation 118. If so, the sequencer deactivates the SM, at a deactivation operation 126. If not, the sequencer binds the state handler of the next state by updating the state pointer, at a state updating operation 122. The method then loops back to step 94 above. The scheduling process continues until all the SMs related to the event have been executed, and the sequencer returns to idle state 98.

In some embodiments, the method of FIG. 3 is implemented using the following pseudo-code. The first pseudo-code section corresponds to operations 90-106 of FIG. 3. The second pseudo-code section corresponds to operations 110-126 of FIG. 3:

```
event_id_x_Handler ( )
{
SetEventOccurrence(EventDataBase[eventID, timeFrameIndex])
   For (1:n:Num of relevant SM) do
   {
```

-continued

```
      If (SM_ind (i) is active)
      {
         Jump SM_Current_state (i) ;
      }
   }
   BackToIdle ( ) ;
}
State_handler_x ( ) {
StateCondition=CheckStateCond (EventDataBase [eventID,
timeFrameIndex] )
   if (StateCondition) {
      ExecuteState ( ) ;
      UpdateStatePointer ( ) ;
      //In case this is the last state in the SM
      DeactivateSM_x ( ) ;
      // Optional - activating any SM
      ActivateSM_y ( ) ;
   }
}
```

Although the embodiments described herein mainly address event-driven state machines, the methods and systems described herein can also be used in other applications, such as with state machines that time-driven as well as event-driven. The methods and systems described herein can generally be used in any suitable embedded system for managing software and/or hardware accelerators (e.g., as used in execution of RF sequences).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a communication device configured to receive and transmit signals in a series of time frames of a communication protocol, defining multiple state machines comprising states and respective state conditions that depend on a set of events, each state machine executing a respective processing task relating to reception or transmission of the signals;

defining relative priorities to be applied among the state machines in scheduling the state machines for execution in response to the events;

monitoring the events and evaluating the state conditions based on the monitored events; and receiving and transmitting the signals by executing multiple instances of the state machines in multiple respective time frames of the protocol, based on the evaluated state conditions, using a scheduling order that depends on the priorities.

2. The method according to claim 1, wherein defining the priorities comprises defining first priorities for scheduling the execution of a first subset of the state machines in response to a first event in the set, and defining second priorities, different from the first priorities, for scheduling the execution of a second subset of the state machines in response to a second event in the set.

3. The method according to claim 1, wherein defining the state machines comprises defining for each state machine a respective subset of the events that is to trigger the state machine, and wherein executing the state machines comprises triggering each state machine only in response to detecting one or more of the events in the respective subset.

4. The method according to claim 1, wherein defining the state machines comprises defining the state conditions depending on an occurrence pattern of the events over a history interval that spans a plurality of the time frames.

5. The method according to claim 4, wherein executing the state machines comprises assigning operating parameters to a given state machine in a first time frame, and actually activating the given state machine in a second time frame that is different from the first time frame.

6. The method according to claim 4, wherein executing the state machines comprises activating a first instance of a given state machine in a first time frame, and activating a second instance of the given state machine, independently of the first instance, in a second time frame.

7. The method according to claim 1, wherein executing the state machines comprises triggering one or more hardware or software modules in the communication device.

8. Apparatus, comprising:
   processing circuitry, which is configured to receive and transmit signals in a series of time frames of a communication protocol, to execute multiple state machines comprising states and respective state conditions that depend on a set of events, each state machine configured to execute a respective processing task relating to reception or transmission of the signals;
   a memory, which is configured to store a definition of relative priorities to be applied among the state machines in scheduling the state machines for execution in response to the events; and
   a sequencer, which is configured to monitor the events and evaluate the state conditions based on the monitored events, and to instruct the processing circuitry to execute multiple instances of the state machines in multiple respective time frames of the protocol, based on the evaluated state conditions, using a scheduling order that depends on the priorities.

9. The apparatus according to claim 8, wherein the memory is configured to store first priorities for scheduling the execution of a first subset of the state machines in response to a first event in the set, and to store second priorities, different from the first priorities, for scheduling the execution of a second subset of the state machines in response to a second event in the set.

10. The apparatus according to claim 8, wherein the processing circuitry is configured to define for each state machine a respective subset of the events that is to trigger the state machine, and wherein the sequencer is configured to trigger each state machine only in response to detecting one or more of the events in the respective subset.

11. The apparatus according to claim 8, wherein the processing circuitry is configured to define the state conditions depending on an occurrence pattern of the events over a history interval that spans a plurality of the time frames.

12. The apparatus according to claim 11, wherein the sequencer is configured to assign operating parameters to a given state machine in a first time frame, and to actually activate the given state machine in a second time frame that is different from the first time frame.

13. The apparatus according to claim 11, wherein the sequencer is configured to activate a first instance of a given state machine in a first time frame, and to activate a second instance of the given state machine, independently of the first instance, in a second time frame.

14. The apparatus according to claim 8, wherein, by executing the state machines, the processing circuitry is configured to trigger one or more hardware or software modules in the apparatus.

15. A mobile communication terminal comprising the apparatus of claim 8.

16. A chipset for processing signals in a mobile communication terminal, comprising the apparatus of claim 8.

* * * * *